June 10, 1969 A. S. PARKS 3,448,750
METHOD AND DEVICE FOR RELEASING PRESSURE
OF A PRESSURIZED SYSTEM
Filed July 20, 1964

INVENTOR.
ASBURY S. PARKS
BY
*Head & Johnson*
ATTORNEYS

United States Patent Office 3,448,750
Patented June 10, 1969

3,448,750
METHOD AND DEVICE FOR RELEASING PRESSURE OF A PRESSURIZED SYSTEM
Asbury S. Parks, Houston, Tex., assignor to Dover Corporation, W. C. Norris Division, Tulsa, Okla., a corporation of Delaware
Filed July 20, 1964, Ser. No. 383,590
Int. Cl. F16k *31/00;* F17d *3/02*
U.S. Cl. 137—14                                    11 Claims This invention relates to a pressure release device and to a method of releasing the pressure of a pressurized system. More particularly the invention relates to a device and method for controlling the bursting pressure of rupture discs. In another sense the invention relates to a device and method for releasing the pressure of a pressurized system including means whereby the pressure at which the system is released can be more accurately controlled.

Most pressurized systems (and by pressurized system is included pressure vessels) are equipped with a device to prevent the pressure within the system from exceeding a predetermined maximum limit. One basic type of such devices is the well known pressure relief valve or pop-off valve. This type functions to vent the system through a valve at a preselected pressure, and is limited to the application wherein pressure is relieved at a relatively slow rate. The common pop-off valve is comprised of a spring loaded plug sealing a port through which fluid escapes when the internal pressure under the plug exceeds the set force within the spring. These devices may be adjusted and set rather accurately, but are subject to corrosion or scale formation which might prevent the opening of the valve when necessary. Also, it is common knowledge that once a pop-off valve has popped open, it rarely seals again when it closes. In addition there are many applications where a small amount of the fluid within a process escaping to the atmosphere would be dangerous or objectionable. Obviously, the only factor within the process which may cause the valve to open is a rise in pressure; it cannot be controlled by any other variable within the process, such as temperature.

Another common means for releasing pressure from a system is the ordinary motor valve which opens in response to a signal from a control instrument; this is the common "back pressure valve" found on many separators in the oil field. Such devices are common in processing plants. However, such valves are mechanical in operation, and are subject to the same problems of scale and corrosion in the moving parts, just as are the ordinary "pop-off valves." The problem is more acute in situations where the valve is a safety valve; that is, the valve is not required to operate for long periods, and then is suddenly called upon to release the pressure after all other means have failed. Formation of scale, corrosion, or ice may prevent the mechanical operation of the valve.

Another type of pressure relief device, and the type which this invention involves, is the type providing an immediate large volume pressure relief and is usually referred to as the rupture disc type. In the usual arrangement a relatively large diameter opening in communication with the system is sealed by a rupturable disc. When the pressure in the system exceeds that which the disc will retain, the disc ruptures, thereby permitting a large volume of fluid, be it liquids or gases, to immediately escape.

A difficult problem with the rupture disc type of pressure release is that of calibration. The only way to determine the exact pressure at which a particular disc will rupture is to subject it to increasing pressures until it does rupture, but this of course destroys the disc. Manufacturers typically make a representative number of destructive tests of each batch of discs manufactured and assign a rupture pressure rating to the discs. Even under the closest manufacturing tolerances the pressure at which a disc will rupture is predictable only within a relatively wide range.

Another problem with present rupture discs is that in use they are subject to the environment in which they are placed and corrosion deteriorates their pressure retarding capabilities. In addition, stress in a metal disc which approaches the rupturing point results in the metal creeping, that is, the metal will slowly stretch under constant stress and in time a disc will rupture at a much lower pressure than is required if the disc is subject to a sudden increase of pressure soon after it is in use. Thus, the short time rupture test given as part of the manufacturing process does not provide an accurate and true indication of the pressure which will actually rupture discs continually subjected to pressure over a period of time. Tests to determine the creep rate, the time for rupture under conditions of constant stress and temperatures and other information necessary for accurately predicting the time-stress-rupture characteristics of any metal, are very difficult to conduct and yield widely varying results. Thus, the prediction of the actual bursting pressure of any given disc is virtually impossible.

For the reasons above enumerated, rupture discs, although widely used, provide erratic results. It is not uncommon for a disc which has been in service for a period to burst below the rated bursting pressure. Similarly, discs have failed to burst when pressure within the system which they are supposed to protect rises above the rated bursting pressure.

Another shortcoming in the present devices utilizing a rupture disc is that there is no control over the rupturing pressure, that is, the disc ruptures only upon the application of pressure to the rupture point. Thus, the present application of rupture discs is limited to the relief of pressure when the pressure has risen to the rupture point and they cannot be used to relieve pressure under any other conditions.

Another shortcoming in present rupture disc pressure release devices is that there is no way to vary the release pressure. A rupturable disc bursts at its inherent rupture pressure. If a different release pressure is desired the system must be depressurized to permit the removal of the old disc and the replacement of it with the new disc having the different bursting pressure. Of course, in many installations depressurizing a system is costly and otherwise highly undesirable.

A "safety valve" is a valve of last resort; it must operate when all else has failed; this is the function of the safety head or rupture disc as is presently used. Many companies have rules regarding the installation of the bursting discs so that the installation of a hand operated valve in the line leading to the rupture disc is not permitted. This is to prevent any possibility of the line to the disc being blocked at any time. Thus, when the disc blows, the system must blow down completely before the disc can be replaced. What this amounts to is that a rupture disc is the "final" link in the chain of safety devices; when it blows, the pressure within the whole system must go completely. The rupture head is this vital "final link," and at the same time must not blow before the desired time; if this happens, there is no way to prevent the system from blowing down completely. In complex processes, such an unwarranted blowing down of pressure could be very expensive in terms of lost time and in trouble in getting back on stream.

In certain processes it may be desired to bring about an "emergency" release of total pressure by one or more conditions prevalent in different parts of the process. Such conditions might be pressure, temperature, liquid level, or other variables that influence the safety of the operation. Presently, rupture discs are limited only to release by pressure, brought about by an increase of pressure in the particular vessel or line to which the disc is connected. With the multiple disc system of this invention, it is possible to operate the means for releasing the loading pressure with a signal from any one of a number of instruments; these instruments may be sensing pressure, temperature, liquid level, etc. and may be located at places remote from the pressure release device.

It is therefore an object of this invention to provide a device and method including means of controlling the bursting pressure of rupture discs.

Another object of this invention is to provide a means for releasing pressure of a pressurized system suddenly and completely in a manner wherein the pressure at which release occurs can be accurately predetermined.

Another object of this invention is to provide a device and method for immediately and completely releasing the pressure of a pressurized system which overcomes the disadvantages and limitations of the present type rupture disc devices.

Another object of this invention is to provide a multiple disc arrangement which gives the control flexibility of the motor valve pressure release systems, but while at the same time is not vulnerable to the possibility of failure due to scale, corrosion, ice, etc.

Another object of the invention includes controlling the rupturing of a disc from remote points within a process including the utilization of signals from instruments sensing pressure, temperature, liquid level, rate of flow, or other variable conditions which might be prevailing within the process to effect the release of the loading pressure.

Presently, a rupture disc is installed for its rated pressure. To change the bursting point the system must be depressurized and the disc changed as has been previously discussed. It is an object of this invention to provide a multiple disc system wherein the bursting pressure of a disc may be varied rather widely without the necessity of depressurizing or otherwise disrupting the system.

Another object of this invention is to enable bursting discs to be used in service wherein the prevailing pressure differential across the disc is substantially below the bursting pressure of the disc, and at the time the disc is required to rupture, the differential in pressure across the disc is substantially greater than the pressure required to burst the disc.

Another object of this invention is to enable the use of bursting discs of an "approximate" bursting pressure rating in service where a "precise" bursting pressure is required.

These and other objects will be fulfilled and a better understanding of the invention may be had by referring to the following description and claims taken in conjunction with the attached drawings, in which:

This invention may be described as a pressure release device and method for releasing the pressure of a pressurized system. More particularly, but not by way of limitation, the invention may be described as a pressure release device and method for releasing the pressure of a pressurized system comprising a multiplicity of rupturable discs in serial closed communication, each disc having an inherent bursting pressure less than the pressure of the pressurized system, the first of the multiplicity of discs having communication with the pressurized system, means of pressure loading between adjacent discs, and means of varying the pressure loading between the discs to cause rupture of all the discs.

Figure 1:
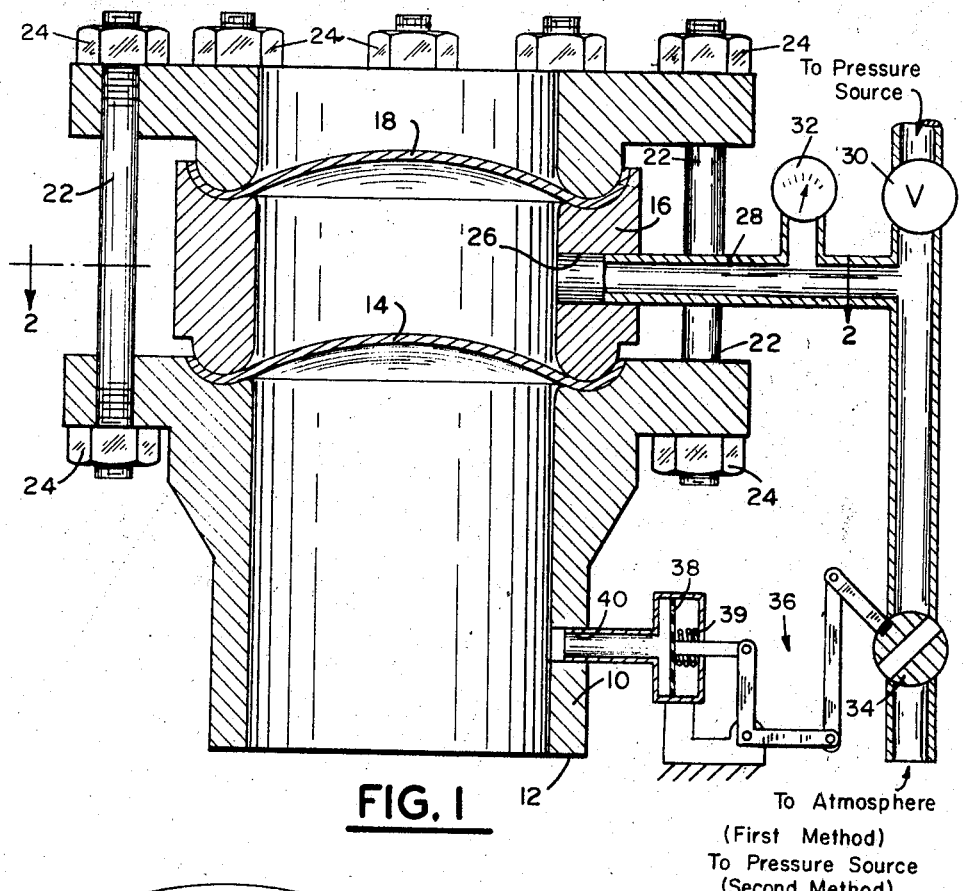
FIGURE 1 is a cross-sectional view of a pressure release device illustrating an embodiment of the invention and further illustrating a means of applying the method of this invention.

Referring now to the drawings and first to FIGURE 1, a device embodying the principles of the invention is shown. A tubular outlet member 10 is provided which may be affixed at the lower end 12 to a pressurized system, such as a pressure vessel, to provide closed fluid communication with the interior of the system. Closing the opposite end of the outlet member 10 is a first rupturable disc member 14 having an inherent bursting pressure below the desired release pressure of the system. A tubular spacer member 16 is provided having closed engagement at one end around the total exterior periphery of disc 14. The opposite end of spacer member 16 is closed with a second rupturable disc 18 which also has an inherent bursting pressure below the desired release pressure of the system. A flange provides means of retaining the total periphery of the second disc 18 in fluid tight engagement with spacer 16.

Bolts 22 and nuts 24 provide means of clamping the flange and spacer 16 to the outlet 10 to support discs 14 and 18 in closed spaced relationship.

Spacer member 16 is provided with a loading pressure opening 26 receiving a conduit 28 by which loading pressure may be applied between the spaced discs 14 and 18.

The area between discs 14 and 18 may be loaded with any fluid, either gas or liquid, but, because of comparative ease of maintaining pressure, gas is preferred. Pressure loading of the discs may be accomplished from any pressure source, such as from the pressurized system to which the device is affixed. A pressure filling valve 30 may be used to admit sufficient fluid through opening 26 to attain the desired loading pressure. A gauge 32 may be used in communication with opening 26 to indicate the loading pressure.

The device of this invention functions in either one of two basic methods. The first basic method of operation, which is explained in greater detail subsequently, is to release the loading pressure between the disc when it is desired to relieve the pressure of the pressurized system to which the device is affixed. This may be accomplished by opening release valve 34, which, when opened, communicates the area between discs 14 and 18 with the atmosphere. Release valve 34 may be opened manually or by any type of mechanical means, and such mechanical means includes hydraulic means, pneumatic means, electrical means, etc.

By way of example of the application of the invention, the rudiments of an automatic mechanical means of releasing the loading pressure between the discs is shown. Release valve 34 is connected by mechanical linkage 36 with a diaphragm 38 biased by a spring 39. The diaphragm 38 is in closed communication with the interior of the pressurized system through opening 40 in outlet member 10. As pressure increases within the pressurized system to the maximum desired level the force of spring 39 is overcome and by linkage 36 the movement of diaphragm 38 opens release valve 34, releasing the loading pressure between discs 14 and 18.

The second basic method of utilizing the invention is to rupture the outer disc 18 to thereby relieve the loading pressure applied to inner disc 14. Since the inner disc 14 has an inherent bursting pressure less than that of the pressurized system to which the device is affixed, the removal of the loading pressure will result in its immediate rupture to relieve the pressure of the system. When this second basic method of utilizing the invention is practiced, release valve 34 controllably communicates opening 26 with a high pressure source, such as by means of conduit (instead of to the atmosphere as indicated when the first basic method is used). The pressure source to which conduit is connected must be sufficient to quickly rupture outer disc 18 when release valve 34 is moved to the open position. Since the first basic method of utilizing the invention does not require a source of fluid bursting pressure to achieve functioning of the device, the first method is preferred.

It is to be understood that the elements 30 through 40 of FIGURE 1 of the drawings are shown only for purposes of exemplifying methods of applying the invention and are not a part of the invention and further that the methods exemplified are not by way of limitation as a multitude of alternate methods of utilizing the invention are apparent.

Figure 2:
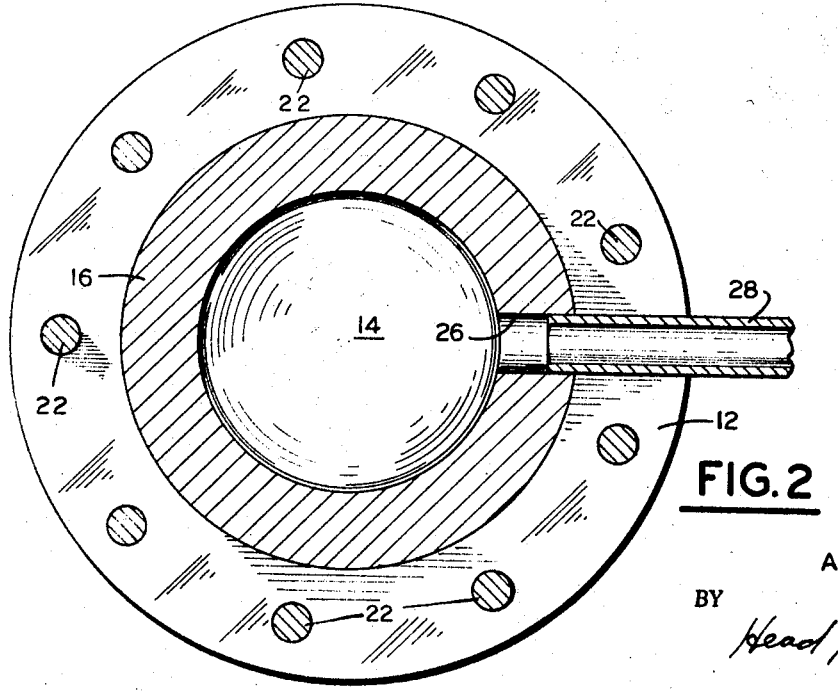
FIGURE 2 is a cross-sectional view taken along the line 2—2 of FIGURE 1.

FIGURE 2 shows a cross-sectional view illustrating the tubular construction of the device, it being understood that the embodiment set forth in FIGURES 1 and 2 is only by way of example and that other geometrical configurations may be utilized within the scope of the invention.

OPERATION

For purposes of illustration, assume that the device of this invention is utilized to limit the pressure of a pressurized system to which outlet 10 is affixed to a maximum pressure of 1,000 pounds. The usual method of accomplishing this is to provide a single disc calculated to rupture when the pressure in the system rises to the level of 1,000 pounds. As previously indicated, this is not accurately and dependably accomplishable since the exact pressure at which the disc will rupture is substantially impossible to predict. Utilizing the system of this invention the exact pressure at which the sytsem will function to provide immediate and complete pressure release of the system is attainable with a high degree of predictable accuracy. As an example, the first and second discs 14 and 18 may be selected so that each is calculated to rupture when subjected to a pressure of 600 pounds. A loading hydrostatic pressure may then be applied within spacer 16 through opening 26 of 500 pounds pressure. With 500 pounds hydrostatic pressure loaded between first disc 14 and second disc 18 it means that a pressure difference of 500 pounds is applied to second disc 18. Further it means that a pressure of 500 pounds is applied to the exterior of first disc 14. With a pressure of 1,000 pounds within the outlet 10 the pressure differential across disc 14 will be 500 pounds, still well below the anticipated rupture pressure of the disc. When it is desired that the pressure of the system be relieved, all that is necessary is that the loading pressure within spacer 16 be released. This action causes the pressure differential across disc 14 to jump immediately from 500 pounds to 1,000 pounds and since it is manufactured to rupture at approximately 600 pounds, it will rupture immediately. Upon the rupture of discs 14 the complete internal pressure of the system of 1,000 pounds is applied to second disc 18 and, since it is also manufactured to rupture at approximately 600 pounds, it will immediately rupture. In this way it can be seen that the two discs 14 and 18, by controlling the loading pressure applied through opening 26 to the interior of spacer 16, can be made to rupture accurately and controllably.

In summary, the basic method of utilizing the device of this invention to release the pressure of a pressurized system is as follows:

(1) Closing the system with an inner rupturable disc having a bursting pressure less than the pressure in the system;

(2) Applying a loading pressure between the inner and the outer discs whereby the pressure differential across the disc is less than the bursting pressure of the disc; and (3) Reducing the loading pressure whereby the pressure differential across the inner disc bursts the inner disc and subsequently the outer disc.

Alternately, step three may consist of increasing the loading pressure whereby the pressure against the outer disc causes it to burst, releasing all loading pressure against the inner disc which causes it to burst by the effect of the system pressure. As previously discussed, automatic means, such as releasing valve 34, linkage 36 and diaphragm 38, may be utilized to accomplish step three.

As a practical matter, the pressure release device of this invention is installed in the system at a time when there is no pressure within the system. As the system pressure is applied, at the same time, the loading pressure is applied; that is, in practice, there is preferably some means, either manual or automatic, that will permit the loading pressure to "track" the system pressure as it builds up. As the system is being built up, the loading pressure is simultaneously being built up at a rate such that differential across the disc is well below the bursting pressure at all times.

This invention provides a pressure release device and method having two basic applications. The first is a method and device for releasing pressure in a pressurized system by means of varying the loading pressure between two or more discs in closed communication to achieve rupture of the discs. The second basic application of the device and method of this invention is the provision of means of providing pressure release of a pressurized system, to release the pressure of the system when it rises to a predetermined maximum point, without requiring variation of loading pressures, but in a manner whereby the preselected maximum system pressure may be varied. In the latter application the loading pressure between the discs is preselected to be the difference between the preselected maximum system pressure and the inherent bursting pressure of the inner disc, the inherent bursting pressure of the inner and outer discs both being below the preselected maximum system pressure. In this method the loading pressure once applied may remain constant. When the system pressure rises to the point whereby the differential pressure across the inner disc reaches its inherent bursting pressure it will rupture, and of course the outer disc will then immediately also rupture. In this manner a rupturable disc pressure release system is provided which does not require loading pressure variation to cause it to function but wherein the preselected pressure at which the release system will rupture is variable without the necessity of depressurizing the system.

It is apparent that neither the device nor the method of this invention is limited to the use of only two rupture discs. In essence the invention is a "multiple disc" system which can be made up of two or more discs in series with a loading pressure between adjacent discs. Such multiple disc arrangements permit changes in the ratios of loading factors and bursting factors of the individual discs to a greater degree than is possible with only two discs. The described application of two discs is illustrative only and it can be seen that the same principles of the invention may be applied to multiple disc arrangements of any number of two or more discs.

This invention has been described in a certain degree of particularity, it being manifest that many changes may be made in the details of construction and the arrangement of components without departing from the spirit and scope of this disclosure.

What is claimed:

1. A pressure release device for releasing fluid under pressure from an outlet of a pressurized system comprising:

a first rupturable disc adapted to extend across the outlet for normally sealing the outlet, the first disc having an inherent bursting pressure less than the preselected maximum pressure of the system;

a second rupturable disc in exterior spaced closed communication with the first disc, the second disc having an inherent bursting pressure less than the preselected maximum pressure of the system, the said first and second discs having fluid loading therebetween so that the differential pressure across the first disc is less than its inherent bursting pressure; and means effective to release the fluid loading between the discs so that the first and then the second disc ruptures to release the pressure of the system through the outlet.

2. A pressure release device according to claim 1 including:
a valve means in communication with the closed communication between the first and second discs, the valve means providing the said means effective to release the fluid loading between the discs.

3. A pressure release device according to claim 2 including:
means responsive to the pressure of the pressurized system to actuate the valve means and thereby release the loading pressure between the discs when the pressure in the system reaches a predetermined level.

4. A pressure release device for releasing fluid under pressure from an outlet of a pressurized system comprising:
a first rupturable disc adapted to extend across the outlet for normally sealing the outlet, the first disc having an inherent bursting pressure less than the preselected maximum pressure of the pressurized system;
a second rupturable disc in exterior spaced closed communication with the first disc, the second disc likewise having an inherent bursting pressure less than the preselected maximum pressure of the pressurized system, the said first and second disc having fluid loading therebetween so that the first disc is able to withstand pressures within the pressurized system exceeding its inherent bursting pressure; and
means effective to increase the fluid loading pressure between the discs so that the second and then the first disc ruptures to release the pressure of the system through the outlet.

5. A pressure release device for releasing fluid under pressure from a pressurized system, comprising:
a tubular outlet member having communication at one end thereof with the pressurized system;
a first rupturable disc closing the other end of the outlet member, the first disc having an inherent bursting pressure below the desired release pressure of the system;
a hollow space member having sealed engagement at one end with the first rupturable disc and having a loading pressure opening therein;
a second rupturable disc closing the other end of the spacer member, the second disc having an inherent bursting pressure below the desired release pressure of the system, the loading pressure opening in said spacer member having means for releasably pressure loading between the first and second discs so that the loading pressure is less than the inherent bursting pressure limit of the second disc and the differential pressure across the first disc is less than its inherent bursting pressure.

6. A pressure release device according to claim 5 including:
a valve means in communication with the loading pressure opening of the spacer member, the valve means operable upon actuation to release the loading pressure.

7. A pressure release device according to claim 6 including:
means responsive to the pressure of the pressurized system to actuate the valve means and thereby release the loading pressure between the discs when the pressure in the system reaches a predetermined level.

8. A pressure release device for releasing the pressure of a pressurized system comprising, in combination:
a multiplicity of rupturable discs in serial closed communication, each disc having an inherent bursting pressure less than the pressure of the system, the first of the discs closing said pressurized system;
means of pressure loading between adjacent discs whereby the differential pressure across the discs is less than the bursting pressure thereof; and
means of varying the pressure loading between the discs to cause rupture of all the discs.

9. A pressure releasing device for releasing the pressure of a pressurized system, comprising, in combination:
a conduit having one end in closed communication with the pressurized system;
at least two pressure rupturable discs spaced apart from each other in the conduit and having pressure tight sealing engagement with the wall of the conduit to permit the retention of fluid pressure between adjacent discs, each of the discs having an inherent bursting pressure less than the pressure of the pressurized system;
means for injecting fluid pressure of predetermined amounts between adjacent discs; and
means for changing said predetermined amount of fluid pressure between adjacent discs in a manner to cause rupturing of all the discs.

10. A method of controllably releasing the pressure of a pressurized system comprising the steps of:
constraining the pressure of the system with a first means rupturable at a pressure less than the system pressure;
applying a loading pressure to the first rupturable means whereby the differential pressure across the means is less than the rupture pressure;
constraining the loading pressure with a second rupturable means having a rupture pressure less than the pressure of the system; and
reducing the loading pressure whereby the differential pressure causes the first means to rupture and thereby apply the pressure of the system to the second rupturable means to cause it to rupture.

11. A method of controllaby releasing the pressure of a pressurized system comprising the steps of:
constraining the pressure of the system with a first means rupturable at a pressure less than the system pressure;
applying a loading pressure to the first rupturable means whereby the differential pressure across the means is less than the rupture pressure;
constraining the loading pressure with a second rupturable means having a rupture pressure less than the pressure of the system; and
increasing the loading pressure to the rupture pressure of the second rupturable means causing it to rupture thereby removing the loading pressure whereby the first means ruptures.

References Cited

UNITED STATES PATENTS

| | | | |
|---|---|---|---|
| 1,584,523 | 5/1926 | Egbert | 220—89 |
| 2,346,727 | 4/1944 | Camp | 220—89 |
| 2,580,365 | 1/1951 | Simmonds | 220—47 X |
| 2,788,794 | 4/1957 | Holinger | 137—71 |
| 2,895,492 | 7/1959 | Bell | 137—68 |
| 3,092,286 | 6/1963 | Duff | 137—68 X |

ALAN COHAN, *Primary Examiner.*

R. GERARD, *Assistant Examiner.*

U.S Cl. X.R.

137—69; 220—89